United States Patent [19]

Sato et al.

[11] Patent Number: 4,527,392
[45] Date of Patent: Jul. 9, 1985

[54] BYPASS VALVE ACTUATOR FOR INERTIA SUPERCHARGING IN MULTICYLINDER ENGINES

[75] Inventors: Akihiko Sato; Akira Watanabe, both of Hino, Japan

[73] Assignee: Hino Jidosha Kogyo Kabushiki Kaisha, Tokyo, Japan

[21] Appl. No.: 485,815

[22] Filed: Apr. 18, 1983

[51] Int. Cl.³ .............................. F02B 27/00
[52] U.S. Cl. ........................... 60/313; 123/52 MB
[58] Field of Search ............... 123/52 MB, 52 M; 60/313

[56] References Cited

FOREIGN PATENT DOCUMENTS

| 2249733 | 4/1974 | Fed. Rep. of Germany . | |
| 1317993 | 1/1963 | France . | |
| 1390518 | 1/1965 | France . | |
| 2378183 | 8/1978 | France . | |
| 115818 | 9/1981 | Japan | 123/52 MB |
| 148023 | 9/1982 | Japan | 123/52 MB |
| 57-148024 | 9/1982 | Japan . | |

*Primary Examiner*—Douglas Hart
*Attorney, Agent, or Firm*—Flynn, Thiel, Boutell & Tanis

[57] ABSTRACT

A bypass passage interconnects intake manifold passages and has a bypass valve disposed therein for shifting the tuning point for inertia supercharging, the bypass valve being actuatable to close and open the bypass passage by a bypass valve actuator operatively connected between the bypass valve and an accelerator-responsive lever for closing the bypass valve when the engine load increases.

4 Claims, 6 Drawing Figures

BYPASS VALVE ACTUATOR FOR INERTIA SUPERCHARGING IN MULTICYLINDER ENGINES

CROSS-REFERENCE TO RELATED APPLICATION

This application is related to copending application Ser. No. 485,688, filed concurrently herewith, and entitled "MULTICYLINDER INTERNAL COMBUSTION ENGINE WITH A COMBINATION TURBOCHARGER AND INERTIA SUPERCHARGER", now abandoned. The disclosure of this related application is, in its entirety, incoporated herein by reference.

BACKGROUND OF THE INVENTION

The present invention relates to an actuator for actuating a bypass valve disposed in a bypass passage provided in an air intake tubine for changing the tuning point in an inertia supercharger for a multicylinder internal combustion engine.

Inertia supercharging for internal combustion engines utilizes a pressure wave generated upon closing of an intake valve in one engine cylinder to increase the charging efficiency for forcing intake air into orther engine cylinders. The inertia supercharging has heretofore been employed in many applications. Since the inertia supercharging relies on pressure waves for the inertia effect, it is most effective at a certain engine RPM which is known as a tuning point, with the charging efficiency being poorer at other engine RPM than the tuning point. To avoid this difficulty, it is necessary to change the tuning point dependent on the engine RPM.

SUMMARY OF THE INVENTION

It is an object of the present invention to provide an internal combustion engine having intake manifold passages interconnected by a bypass passage for changing the tuning point for inertia supercharging, the bypass passage having a bypass valve disposed therein and actuatable by a bypass valve actuator operable in response to the depression of an accelerator pedal for preventing hydrocarbon from being emitted as an exhaust gas when the engine runs idly at high RPM while it is cold.

According to the present invention, a bypass passage interconnects intake manifold passages and has a bypass valve disposed therein for shifting the tuning point for inertia supercharging, the bypass valve being actuatable to close and open the bypass passage by a bypass valve actuator operatively connected between the bypass valve and an accelerator-responsive lever for closing the bypass valve when the engine load increases.

The above and other objects, features and advantages of the present invention will become more apparent from the following description when taken in conjunction with the accompanying drawings in which preferred embodiments of the present invention are shown by way of illustrative example.

DETAILED DESCRIPTION

There is known a combination turbocharger and inertia supercharger for an internal combustion engine in which the inertia supercharger operates at low engine RPM and the turbocharger comes into operation at high engine RMP. With this arrangement, there are instances in which a large amount of hydrocarbon is emitted as an exhaust gas when the engine is running idly while the engine is cold.

Figure 1:
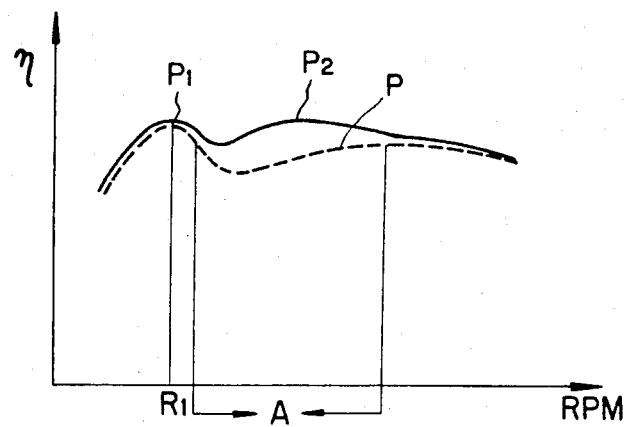
FIG. 1 is a graph showing charging efficiency characteristics explanatory of the present invention.

FIG. 1 is a graph having a vertical axis indicating charging efficiency and a horizontal axis indicating engine RPM, the charging efficiency versus the engine RPM being shown as a dotted-line curve P. The graph of FIG. 1 indicates that a tuning point for inertia supercharging is at $R_1$ on the engine RPM axis, and the charging efficiency has a peak $P_1$ at this point $R_1$. When the engine runs idly (such as right after engine start-up) at RPM in the range A, substantially no load is imposed on the engine with the engine RPM being high in the range A, with the result that the engine is running short of air and the exhaust gas contains a great amount of hydrocarbon.

To prevent this problem, the tuning point $R_1$ for inertia supercharging should be shifted into the higher-speed idling range A. During engine racing, the accelerator pedal is depressed in a stroke, and the tuning point for inertia supercharging should be placed somewhere in the range A in that accelerator stroke. This creates an inertia supercharging characteristic curve which as shown by the solid line in FIG. 1 has two peaks $P_1$, $P_2$, in which case the engine is supplied with air sufficient to prevent hydrocarbon from being emitted during engine racing.

Figure 2:
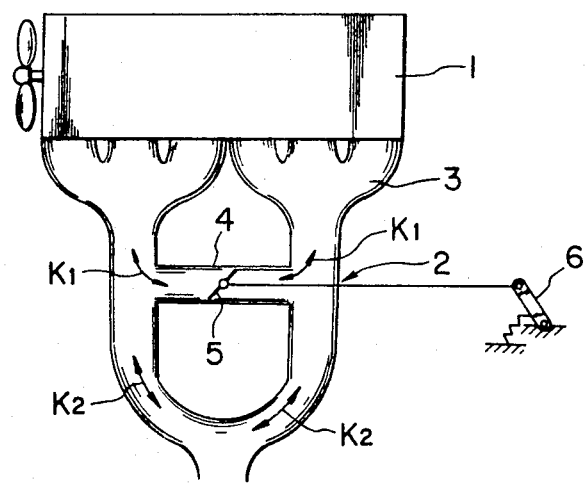
FIG. 2 is a schematic diagram illustrating a bypass valve to which the present invention is applicable.

FIG. 2 shows a bypass passage arrangement for shifting the tuning point for inertia supercharging. As shown, an engine 1 has an intake manifold 2 including a pair of intake tubes 3 each connected to a separate group of cylinders, which tubes 3 are interconnected by a bypass passage 4 having a bypass valve 5 disposed therein and actuatable by an accelerator pedal 6 for opening and closing the bypass passage 4. In the illustrated embodiment, the bypass valve 5 is closed in response to depression of the accelerator pedal 6.

When the engine 1 operates in a range of low engine loads, valve 5 is open and pressure waves are propagated in the directions of the arrows $K_1$ along a short path. The bypass valve 5 remains open when the engine RPM is in the racing range, thus allowing pressure waves to be propagated along the arrows $K_1$. As the engine load increases, the bypass passage 4 is closed by the bypass valve 5 to cause pressure waves to propagate along a longer path in the directions of the arrows $K_2$, with the consequence that the tuning point for inertia supercharging is shifted.

Figure 3:
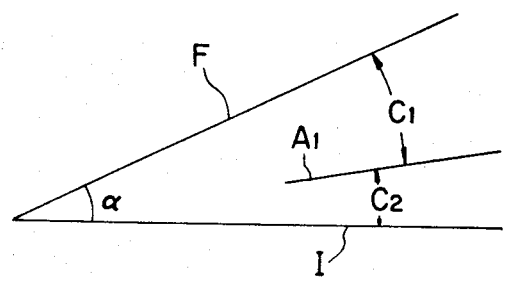
FIG. 3 is a diagram showing the manner in which the bypass valve is opened and closed.

The depression of the accelerator pedal corresponds to the angular displacement of the load lever of a fuel injection pump. FIG. 3 illustrative of the relationship between the angular displacement of the fuel pump load lever and the opening of the bypass valve 5. The load lever angular displacement varies from an idling position I to a full load position F. The bypass valve remains open from the idling position I to a position $A_1$ above the engine racing range. The bypass valve is closed in an angular interval $C_1$ while it is open in an angular interval $C_2$. In the angular interval $C_1$, the bypass valve remains closed irrespective of any angular displacement of the fuel pump load lever, so that there is a lost motion in the operative connection between the load lever and the bypass valve during the angular interval $C_1$.

A bypass valve actuator according to the present invention will now be described.

Figure 4:
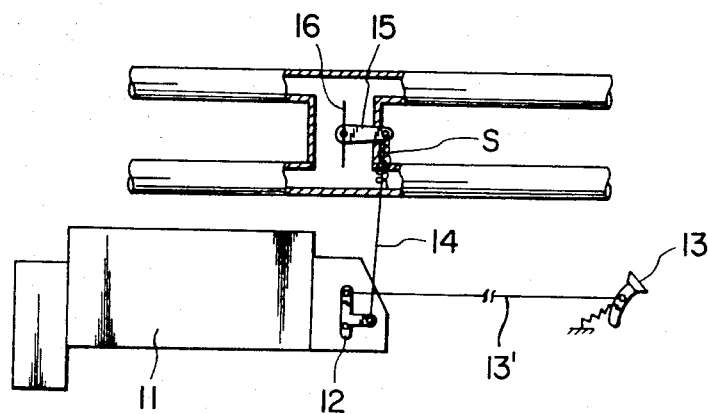
FIG. 4 is an elevational view, partly in cross section, of a bypass valve actuator according to an embodiment of the present invention.

In FIG. 4, a fuel injection pump 11 has a load lever 12 which is pivotally mounted at its lower end and is operatively connected at its upper end to an accelerator pedal 13 through the intermediate link 13'. Lever 12 is also connected to a link 14 which is coupled through a spring S to a lever 15 to which the bypass valve 16 is secured. Therefore, when the accelerator pedal 13 is depressed, the load lever 12 swings counterclockwise and acts through the link 14, the spring S and the lever 15 to close the bypass valve 16. Continued depression of the accelerator pedal 13 causes the load lever 12 to turn further after the bypass valve 16 has been closed, whereupon the continued upward motion of the lever 14 is taken up by the spring S which is compressed. Accordingly, the lost motion as shown in FIG. 4 is allowed by the compression of the spring S. This arrangement is disadvantageous in that the depression of the accelerator pedal 13 is counteracted by the spring S as it is compressed.

Figure 5:
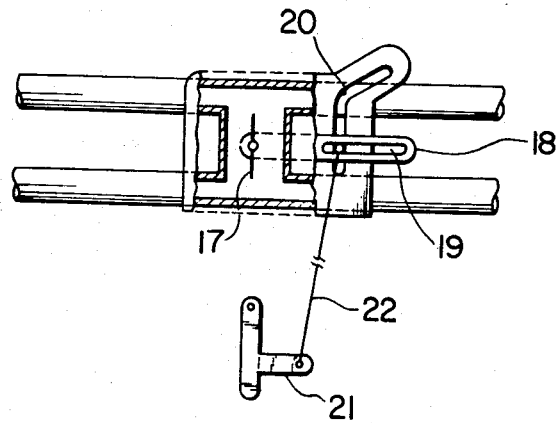
FIG. 5 is an elevational view, partly in cross section, of a bypass valve actuator according to another embodiment of the present invention.

FIG. 5 shows another bypass valve actuator designed to eliminate the foregoing problem. As illustrated in FIG. 5, a pivotal bypass valve 17 is fixed to a lever 18 having a slot 19, and a fixed guide plate has a guide slot 20 extending across the slot 19. A fuel pump load lever 21 is operatively connected to a link 22 having its distal end received in and displaceable along the slots 19 and 20. The guide slot 20 includes, at its upper end, an inclined portion to provide for lost motion between the load lever 21 and the bypass valve 17. The load lever 21 is also connected to the accelerator pedal as shown in FIG. 4. Since the bypass valve actuator has no spring counteracting the accelerator pedal, the latter is prevented from being sluggish on its depression. However, the distal end of the link 22 which is caused to move along both the slots 19, 20 is relatively unsmooth in its motion.

Figure 6:
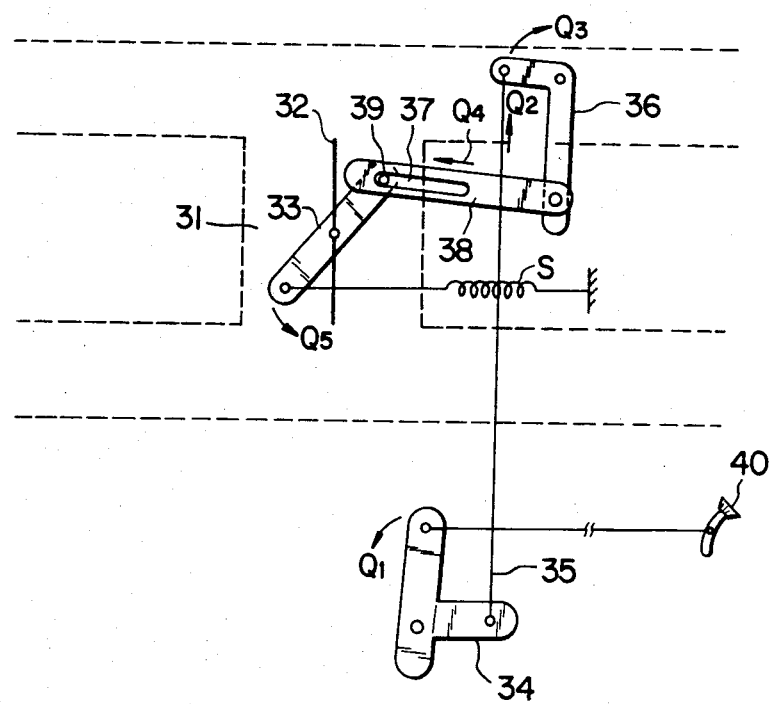
FIG. 6 is an elevational view of a bypass valve according to a preferred embodiment of the present invention.

FIG. 6 illustrates a further improved bypass valve actuator constructed in accordance with still another embodiment of the present invention. A bypass passage 31 has a pivotal bypass valve 32 therein which is fixed to a lever 33 and openable and closable in the bypass passage 31. The lever 33 is connected at one end to a spring S which normally urges the lever 33 in a direction (counterclockwise) to close the bypass valve 32. The lever 33 is angularly moved in response to angular displacement of a fuel pump load lever 34 by a link mechanism which comprises a link 35 operatively connected between the load lever 34 and an L-shaped lever 36, the latter being pivotally mounted adjacent its corner. Lever 36 is also pivotally connected to a stop lever 38 having a slot 37 therealong. The lever 33 has a pin 39 at the end thereof remote from the spring S, which pin 39 is slidably received in the slot 37. The load lever 34 is operatively coupled to an accelerator pedal 40 for being moved in unison therewith.

Operation of the arrangement shown in FIG. 6 is as follows: During engine idling, the bypass passage 31 is opened by the bypass valve 32, as illustrated by FIG. 6. When the accelerator pedal 40 is depressed to run the engine idly at high RPM, the load lever 34 is turned in the direction of the arrow $Q_1$ to displace the link 35 in the direction of the arrow $Q_2$. The L-shaped lever 36 is caused to turn in the direction of the arrow $Q_3$, whereupon the stop lever 38 is shifted in the direction of the arrow $Q_4$. Since the slot 37 is also shifted in the same direction, the lever 33 is allowed to angularly move in the direction of the arrow $Q_5$ under the resiliency of the spring S, thereby causing the bypass valve 32 to close the bypass passage 31.

Since the bypass valve 32 is closed under the force of the spring S, there is no tendency for the accelerator 40 to become heavy or unsmooth on its depression.

Although certain preferred embodiments have been shown and described, it should be understood that many changes and modifications may be made therein without departing from the scope of the appended claims.

What is claimed is:

1. An internal combustion engine comprising:
 a pair of intake manifolds having intake passages, respectively;
 a bypass passage interconnecting said intake passages and having a bypass valve disposed therein for shifting the turning point for inertia supercharging;
 an accelerator-responsive lever;
 a bypass valve actuator operatively connected between said bypass valve and said accelerator-responsive lever for closing said bypass valve when the engine load increases;
 said bypass valve actuator comprising a link operatively connected at one end to said accelerator-responsive lever and a lever connected to said bypass valve, said link having an opposite end connected to said lever through a lost-motion connection.

2. An internal combustion engine according to claim 1, wherein said lost-motion connection comprises a spring acting between said link and said bypass valve.

3. An internal combustion engine comprising:
 a pair of intake manifolds having intake passages, respectively;
 a bypass passage interconnecting said intake passages and having a bypass valve disposed therein for shifting the turning point for inertia supercharging;
 an accelerator-responsive lever;
 a bypass valve actuator operatively connected between said bypass valve and said accelerator-responsive lever for closing said bypass valve when the engine load increases;
 said bypass valve actuator comprising a link operatively connected at one end to said accelerator-responsive lever, a lever connected to said bypass valve and having a slot, and a guide plate having a guide slot, said link having an opposite end received in and displaceable along said slots, said guide slot including an inclined portion to provide a lost-motion connection between said bypass valve and said accelerator-responsive lever to allow the latter to move after said bypass valve has been closed.

4. An internal combustion engine comprising:

a pair of intake manifolds having intake passages, respectively;

a bypass passage interconnecting said intake passages and having a bypass valve disposed therein for shifting the tuning point for inertia supercharging;

an accelerator-responsive lever;

a bypass valve actuator operatively connected between said bypass valve and said accelerator-responsive lever for closing said bypass valve when the engine load increases;

said bypass valve actuator comprising a link operatively connected to said accelerator-responsive lever, a first lever connected to said bypass valve and having a pin, a spring normally urging said first lever in a direction to close said bypass valve, a second lever having a slot receiving said pin, and a third lever operatively connected between said link and said second lever, said link and first through third levers being actuatable by said accelerator-responsive lever to allow said bypass valve to be closed under the force of said spring, said slot serving as a lost-motion connection between said bypass valve and said accelerator-responsive lever to allow the latter to move after said bypass valve has been closed.

* * * * *